Patented Jan. 19, 1943

2,308,792

UNITED STATES PATENT OFFICE

2,308,792

CATALYTIC CONVERSION OF HYDROCARBON OIL

Charles L. Thomas, Chicago, Ill., assignor to Universal Oil Products Company, Chicago, Ill., a corporation of Delaware No Drawing. Application January 16, 1941, Serial No. 374,707

6 Claims. (Cl. 196—52)

This invention relates to an improved process for the conversion of hydrocarbons such as petroleum fractions and hydrocarbonaceous materials generally, including synthetic oil from numerous carbon-containing sources, in the presence of very finely divided suspended catalysts to produce substantial yields of hydrocarbons distilling within the gasoline boiling range and having high antiknock value. The process is applicable to conversion involving single hydrocarbons, synthetically produced hydrocarbon mixtures or primary distillates produced in the destructive distillation of hydrocarbon-containing materials such as coals, lignites and shales. Although practically the whole range of hydrocarbons may generally be processed, more frequently the hydrocarbon fractions charged to the process are of a distillate character.

In the catalytic cracking of hydrocarbon oils, processes have now been developed utilizing the catalyst in the form of granules disposed in beds in reaction chambers of various types. Due to the high activity of the catalyst and the nature of the hydrocarbon reactions, hydrocarbonaceous materials rapidly accumulate upon the surfaces and in the pores of the catalyst so that the catalyst can be used only for a relatively short period of time before regeneration is necessary. A plurality of reactors is therefore usually provided so that one or more reactors may be in process of catalytic cracking while one or more reactors are being conditioned, or in a state of regeneration. The catalyst is usually regenerated by removing the hydrocarbonaceous deposits by oxidation at high temperature in the presence of oxygen-containing gases. It is among the objects of this invention to provide a process whereby considerable saving in plant investment is effected because of the relatively simple catalytic processing equipment utilized when a finely divided catalyst is employed as compared with the extensive equipment required when the catalysts are disposed in a plurality of catalytic reactors provided for alternate use and reactivation. Further objects of the present invention are to improve the contacting conditions of the oil undergoing treatment with the catalyst by utilizing the catalyst in the original state of fine subdivision approaching colloidal dimensions in which it was originally prepared.

In one specific embodiment the present invention comprises mixing an undried synthetic cracking catalyst prepared in a finely divided condition with a hydrocarbon oil and subjecting the wet catalyst in oil suspension to catalytic cracking conditions of temperature, pressure and time to produce large yields of high antiknock motor fuel.

According to the process of the present invention, a specially prepared, finely divided synthetic cracking catalyst is added to the oil charged to the catalytic cracking process while the catalyst is in the undried condition. The synthetic catalysts employed may include various compositions of hydrated silica with hydrous oxides such as those of aluminum, zirconium, magnesium, titanium, vanadium, beryllium and other metal oxides. In some cases two or more of these oxides may be composited with the hydrated silica. Numerous methods may be employed in the preparation of the synthetic catalysts since the components may be separately, concurrently or consecutively precipitated. Generally speaking, the primary and major component is a specially precipitated finely divided hydrated silica which is admixed with a precipitated hydrous metal oxide such as alumina, zirconia or mixtures thereof present in minor proportions. The catalysts are preferably prepared in a very finely divided form in the presence of an added substance capable of causing the formation of said finely divided precipitates under suitable precipitation conditions. The finely divided precipitates remain in suspension for prolonged periods of time and are more suitable in the process of the present invention than similar composites produced in the form of gelatinous precipitates or sols which set into gels upon prolonged standing.

The precipitates are formed under definitely controlled conditions in the presence of suitable added substances such as many salts of alkali and alkaline earth metals. Other inorganic and/or organic compounds or substances may be added which have similar although not equivalent effects in producing the finely divided precipitates which have particle sizes approaching colloidal dimensions. According to one general method of preparation the hydrated silica may be precipitated from a dilute solution of commercial water-glass containing sodium chloride and subsequently admixed with the remaining hydrous oxide components. The finely divided hydrated silica may be admixed with the hydrous oxide components in any suitable manner as for example by admixing the finely divided hydrated silica suspension with a solution of a metal salt and precipitating a hydrous oxide in the presence of the hydrated silica suspension by the addition of a suitable alkaline precipitant.

Although the catalyst preparation may be purified at a subsequent stage of its preparation to remove undesirable impurities such as alkali metal ions, it is preferably treated before compositing the added hydrous oxide components with the precipitated hydrated silica. The hydrated silica in finely divided condition may be washed with acidulated water or solutions of ammonium salts or multivalent metal salts to preferably completely remove sodium or other alkali metal impurities present in the hydrated silica.

In the composites of hydrous oxides with hydrated silica approximately 5 to 30 mols of the hydrated oxides is preferably composited with 100 mols of the hydrated silica. Smaller and higher proportions may however be utilized, but generally speaking, without the same catalytic effectiveness. Thus 5 to 30 mols of hydrated alumina may be composited with 100 mols of hydrated silica, or several mols of alumina and 5 to 10 mols of zirconia, for example, may be composited with 100 mols of the specially precipitated hydrated silica.

The composite of hydrated silica and hydrous oxide is recovered as a filter cake which contains approximately 85 to 90 per cent water and which is ordinarily dried to a moisture content of approximately 15 to 20 per cent. In the drying process the very finely divided particles approaching colloidal dimensions form particle aggregates which are of much larger dimensions and for this reason are not contacted with the oil in subsequent treatment under the most favorable conditions for the conversion reactions. According to the present invention, however, the wet material is mixed with the oil to be catalytically treated in the undried condition and as a result, the drying operation is not only omitted but the catalyst itself is in its original finely divided state for contacting with and converting the hydrocarbon oil with which it is mixed. The catalyst may be mixed with a portion of the oil in a homogenizing procedure employing also an emulsifying agent if desired and the homogenized mixture is charged into the stream of oil directed to catalytic conversion treatment. The catalyst may also be mixed with a small amount of a clean heavier hydrocarbon fraction such as a waxy oil in which the catalyst may be readily suspended to form a uniform suspension, and the mixture then charged into the oil to be catalytically treated. In the heating of the oil containing the suspended catalyst gel the contained water is vaporized and leaves the finely divided catalyst in substantially its original state of subdivision in intimate association with the oil undergoing treatment.

After the oil and catalyst have been contacted under suitable conditions of temperature, pressure and time, the reaction products are separated into vaporous and non-vaporous products, the vaporous products being fractionated to separate gasoline vapors and gas from higher boiling oil which may then be further contacted with the catalyst in separate passes or in admixture with the fresh oil charged to the process. The non-vaporous oil separated from the vaporous products contains the substantially spent catalyst and is removed from the process. The spent catalyst may be separated from adhering oil and subjected to oxidizing treatment at a temperature within the approximate range of 1000–1500° F. to remove adhering hydrocarbonaceous deposits. The regenerated catalyst when substantially freed from alkali metal impurities has a high degree of activity and may be mixed with the oil undergoing treatment using only fresh catalyst to compensate for losses in activity and in the recovery of the spent catalyst.

In an alternative method of operation, hydrocarbons contacted in the vapor phase with the catalyst of this invention may be separated from the catalyst after reaction by various separating procedures including the use of cyclone separators and electrical precipitators, and the vaporous products then subjected to fractionating, condensing and collecting means.

Various types of hydrocarbon conversion reactions take place in the presence of the powdered catalyst depending partly upon the temperature, pressure and time conditions and partly upon the nature of the hydrocarbon oil processed. These reactions may include carbon-to-carbon cleavage, isomerization, cyclization, dehydrogenation, hydrogenation, and desulfurization reactions. In the case of higher boiling hydrocarbons for example there may be a cleavage of long chained carbon-to-carbon bonds and isomerization reactions may also occur whereby the lower boiling hydrocarbons formed tend to become more highly branch chained. Also hydroaromatic hydrocarbons present in the oil undergoing decomposition or formed therein by cyclization of olefins may undergo dehydrogenation to form aromatic hydrocarbons and hydrogen liberated in these reactions may combine with olefins present during the reaction to form paraffinic hydrocarbons. The latter reactions tend to occur at the lower temperatures given in the range of operating conditions whereas more unsaturated hydrocarbons, particularly olefins, are produced in large proportions at the higher temperatures employed. The hydrocarbons generally are of a more branched chain structure than is produced in thermal cracking treatment. The temperatures employed may be within the approximate range of 700–1150° F. more or less and the pressures employed may vary from approximately atmospheric to 300 pounds or more per square inch.

The following specific examples are given to illustrate specific applications of the process of the invention, the method of the catalyst preparation also being indicated. The invention should not be considered as limited to these examples of the process or to the particular catalyst preparations since these are given as illustrations of the novelty and utility of the invention.

*Example I*

A commercial water glass containing approximately 28 per cent $SiO_2$ and 9 per cent $Na_2O$ is diluted approximately 10 times with water to which sodium chloride has been added in an amount equal to approximately ½ of the weight of the water glass used. Hydrochloric acid is gradually added to the diluted water-glass solution while thoroughly agitating and a very finely divided precipitate is formed as a suspension in the solution. The precipitated silica is then filtered and washed with acidulated water. The washed hydrated silica is then suspended in a solution of aluminum chloride and ammonium hydroxide added to precipitate hydrated alumina. The composition of the catalysts produced is in the approximate ratio of $100SiO_2:5Al_2O_3$. The precipitated composite is water washed and the filtered undried composite contains approximately 88 per cent water.

When injecting approximately 1 per cent of the above prepared undried catalyst on a dry weight basis relative to the Pennsylvania oil charged to the process, a yield of approximately 35 volume per cent of 400° F. end point gasoline having a 76 octane number by the A. S. T. M. motor method is produced in a single pass when heating the oil and suspended catalyst to a temperature of approximately 1050° F. under a pressure of approximately 200 pounds per square inch and directing to a reaction chamber where approximately the same pressure is employed and the average temperature is approximately 850° F.

*Example II*

A finely divided hydrated silica is similarly prepared as in Example I and is thoroughly washed with water having a pH of approximately 2 until the hydrated silica is substantially free from sodium as indicated by a magnesium uranyl acetate test. The purified finely divided hydrated silica is then suspended in a solution of aluminum and zirconyl chlorides and ammonium hydroxide to precipitate hydrated alumina and hydrated zirconia in the presence of the hydrated silica. The composition of the preparation on a dry basis is approximately 100 $SiO_2:2Al_2O_3:5ZrO_2$. The composited precipitate is water washed and filtered and the undried filter cake has a water content of approximately 88 per cent.

The undried silica-alumina-zirconia catalyst above prepared is thoroughly homogenized with a waxy distillate in the approximate proportions of 1 per cent catalyst on the dry basis and 3 per cent of the wax distillate based on the oil charged to the process. The above oil mixture is added to a Pennsylvania gas oil having approximately 36° A. P. I. gravity and the oil and suspended catalyst is heated in a tube furnace to a temperature of approximately 1050° F. and at a pressure of approximately 200 pounds per square inch and directed to a reaction chamber at substantially the same pressure where the average temperature is approximately 850° F. Approximately 38 volume per cent of the oil charged of 400° F. end-point gasoline having an octane number of 75 by the A. T. S. M. motor method is formed in a once-through operation under these conditions. The catalyst from this operation is separated from the adhering oil and is then regenerated to remove carbonaceous materials deposited thereon, by heating in the presence of an air-flue gas mixture at a temperature of approximately 1000–1100° F. This regenerated catalyst has approximately 60 to 80 per cent or more of activity of the fresh catalyst and is used in admixture with freshly prepared catalyst, added as a make-up requirement for losses in activity and in regenerating the spent catalyst.

I claim as my invention:

1. A process for the catalytic conversion of a hydrocarbon oil to produce high antiknock gasoline therefrom which comprises subjecting said hydrocarbon oil under cracking conditions to contact with an undried finely powdered synthetic catalyst comprising a mixture of hydrous oxide precipitated from a solution of a metal salt and hydrated silica precipitated in a finely powdered condition.

2. A process for the catalytic conversion of a hydrocarbon oil to produce high antiknock gasoline therefrom which comprises subjecting said hydrocarbon oil under cracking conditions to contact with an undried finely powdered synthetic catalyst comprising a mixture of a precipitated hydrated aluminum oxide and hydrated silica precipitated in a finely powdered condition.

3. A process for the catalytic conversion of a hydrocarbon oil to produce high antiknock gasoline therefrom which comprises subjecting said hydrocarbon oil under cracking conditions to contact with an undried finely powdered synthetic catalyst comprising a mixture of a precipitated hydrated zirconium oxide and hydrated silica precipitated in a finely powdered condition.

4. A process for the catalytic conversion of a hydrocarbon oil to produce high antiknock gasoline therefrom which comprises subjecting said hydrocarbon oil under cracking conditions to contact with an undried finely powdered synthetic catalyst prepared by precipitating a finely powdered hydrated silica from an alkaline silicate solution and mixing with said hydrated silica a hydrous oxide precipitated from a solution of a metal salt.

5. A process for the catalytic conversion of a hydrocarbon oil to produce high antiknock gasoline therefrom which comprises cracking said hydrocarbon oil at a temperature of from about 700° F. to about 1150° F. and at a pressure of from approximately atmospheric to about 300 pounds per square inch in contact with a synthetic cracking catalyst added thereto in an undried condition and prepared by precipitating a finely powdered hydrated silica from an alkaline silicate solution and mixing with said hydrated silica a precipitated hydrated alumina.

6. A process for the catalytic conversion of a hydrocarbon oil to produce high antiknock gasoline therefrom which comprises cracking said hydrocarbon oil at a temperature of from about 700° F. to about 1150° F. and at a pressure of from approximately atmospheric to about 300 pounds per square inch in contact with a synthetic cracking catalyst added thereto in an undried condition and prepared by precipitating a finely powdered hydrated silica from an alkaline silicate solution and mixing with said hydrated silica a precipitated hydrated zirconia.

CHARLES L. THOMAS.